United States Patent
Kranz

(10) Patent No.: US 7,368,833 B2
(45) Date of Patent: May 6, 2008

(54) MULTICHANNEL DC/DC CONVERTER

(75) Inventor: Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 512 days.

(21) Appl. No.: 10/902,324

(22) Filed: Jul. 29, 2004

(65) Prior Publication Data

US 2005/0036255 A1 Feb. 17, 2005

(30) Foreign Application Priority Data

Jul. 29, 2003 (DE) ............................... 103 34 598

(51) Int. Cl.
*H02J 1/12* (2006.01)
(52) U.S. Cl. ........................................................ 307/45
(58) Field of Classification Search .................... 307/45
See application file for complete search history.

(56) References Cited

U.S. PATENT DOCUMENTS 5,617,015 A * 4/1997 Goder et al. ............... 323/282
5,751,139 A * 5/1998 Jordan et al. ............... 323/222
6,437,545 B2 8/2002 Sluijs .......................... 323/222

FOREIGN PATENT DOCUMENTS

JP 11168876 A 6/1999

\* cited by examiner

*Primary Examiner*—Robert L. DeBeradinis
(74) *Attorney, Agent, or Firm*—Dicke, Billig & Czaja, PLLC

(57) ABSTRACT

An apparatus which has a first stage with an input circuit with an inductive element (1), a second stage with a number of output circuits with loads (3, 4, 5) and a switching means (S1, S2, S3) for controlling the currents from the input circuit to the output circuits is used in order to produce a number of independent DC output voltages (V1, V2, V3) from a DC input voltage (Vin). The apparatus according to the invention can be operated in various modes.

16 Claims, 2 Drawing Sheets

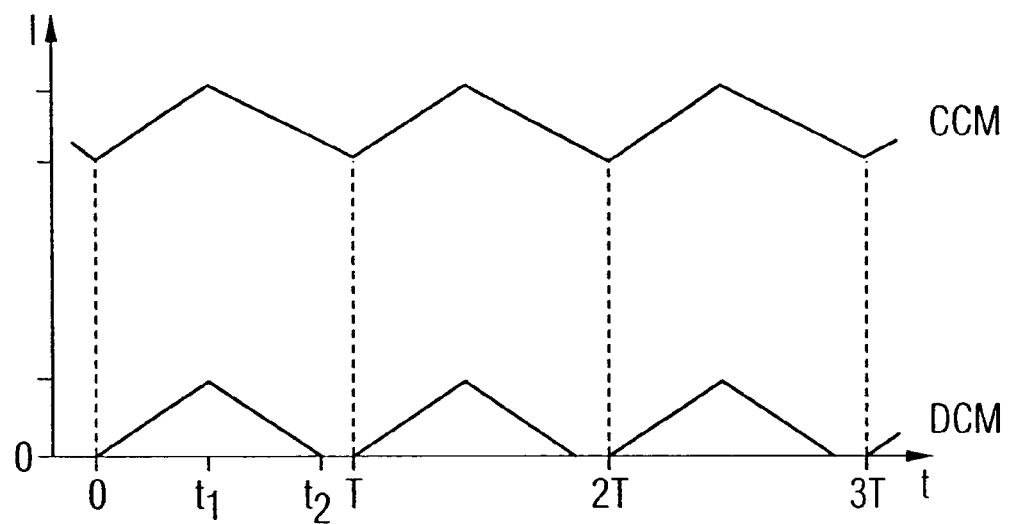
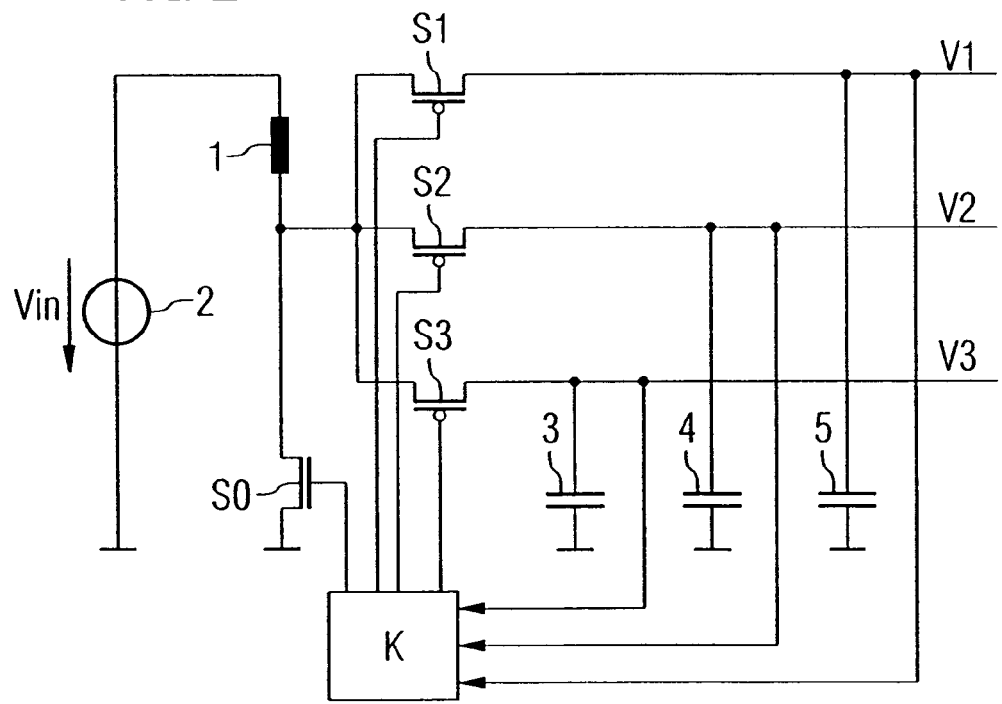

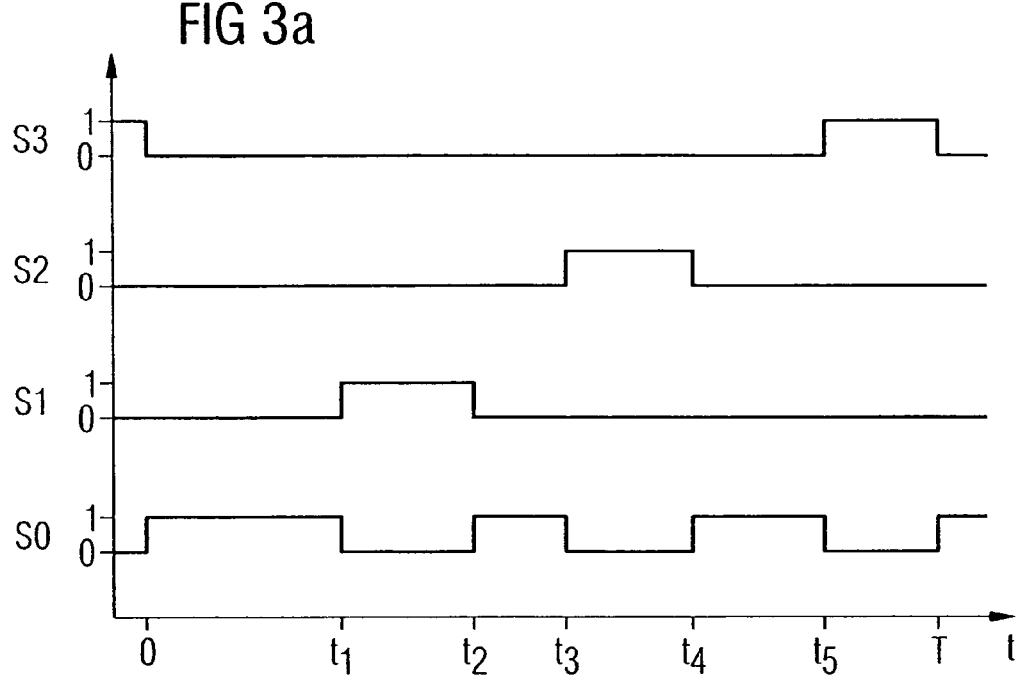
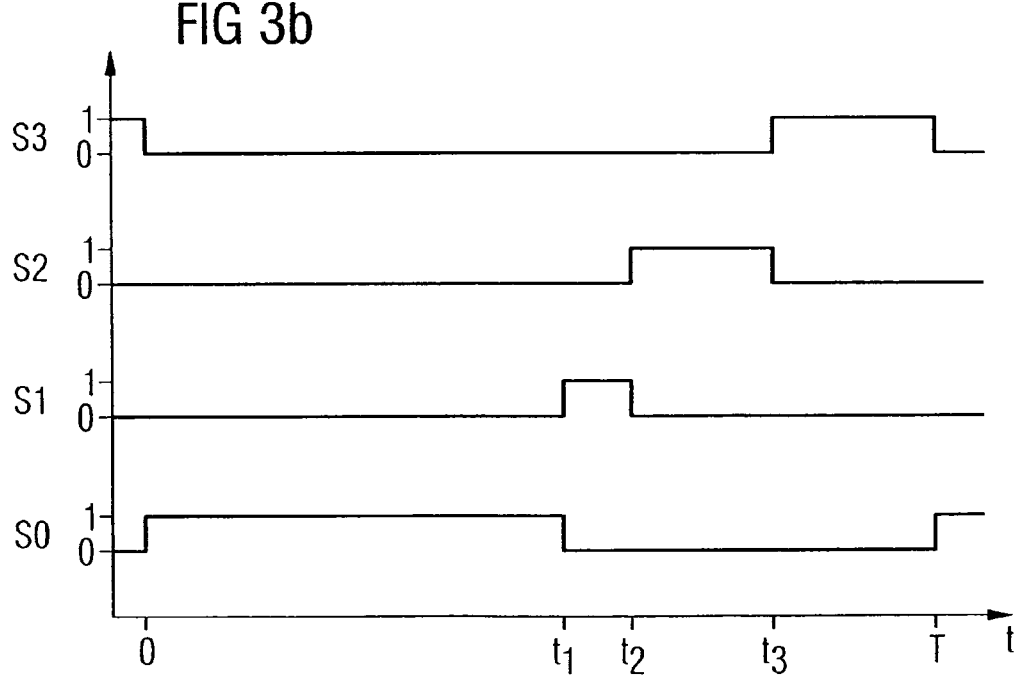

MULTICHANNEL DC/DC CONVERTER

PRIORITY

This application claims priority to German application no. 103 34 598.1 filed Jul. 29, 2003.

TECHNICAL FIELD OF THE INVENTION

The present invention relates to an apparatus and a method for production of a number of DC voltages from a single DC voltage.

BACKGROUND OF THE INVENTION

A number of supply voltages generally have to be provided in circuits and appliances in which it is intended to minimize the power consumption. These supply voltages are produced from a DC input voltage.

So-called DC/DC converters are known for effective conversion of DC voltages. A DC/DC converter can be used to produce any desired DC output voltage from a DC input voltage.

A number of DC/DC converters may be operated in parallel, in order to produce a number of DC output voltages. Owing to the large number of components required, this solution is costly, and also has the disadvantage that the switching losses in the individual DC/DC converters adversely affect the overall efficiency. Another possible way to produce a number of DC output voltages is to produce the highest of the required DC output voltages by means of a DC/DC converter, and to use series regulators to generate the further DC output voltages from the highest supply voltage. This solution is not as costly as the use of a number of DC/DC converters, but, owing to the voltage losses in the series regulators, a considerably reduced overall efficiency must be accepted.

Furthermore, it is already known for transformers with a number of windings to be used in DC/DC converters with a number of output voltages. This has the disadvantage, inter alia, of the large amount of space that is required for this type of DC/DC converter.

SUMMARY OF THE INVENTION

The object of the invention is thus to specify an improved apparatus and an improved method for production of a number of DC output voltages from one DC input voltage. One particular aim in this case is to reduce the component costs.

The object can be achieved by an apparatus for conversion of a DC input voltage to a number of DC output voltages, comprising a first stage, which has an inductive element which can be charged by a current that is produced by the DC input voltage, a second stage, which has a number of output circuits which produce the DC output voltages and each have at least one load, respectively, and a switching means, which is designed to supply a discharge current, which is supplied from the inductive element, to different output circuits in order to feed different loads.

The object can also be achieved by a method for conversion of a DC input voltage to a number of DC output voltages, which method has a cycle in which a number of step elements are carried out and one step element comprises two sub-steps, wherein the two sub-steps of the first step element comprise:

a1) charging of an inductive element with a charging current which is produced by the DC input voltage;

b1) discharging of the inductive element via a first load, which is associated with a first output circuit which produces a first DC output voltage; and the two sub-steps of the second step element comprise:

a2) renewed charging of the inductive element with a charging current which is produced by the DC input voltage; and b2) discharging of the inductive element via at least one second load, which is associated with a second output circuit which produces a second DC output voltage.

The object can furthermore be achieved by a method for conversion of a DC input voltage to a number of DC output voltages, which method has a cycle which comprises the following step elements:

A) charging of an inductive element with a charging current which is produced by the DC input voltage;

B1) partial discharging of the inductive element via a first load, which is associated with a first output circuit which produces a first DC output voltage;

B2) further discharging of the inductive element via at least one second load, which is associated with a second output circuit which produces a second DC output voltage.

The invention is based on the idea that different components can be used for more than one purpose by advantageous control of the current flow within a DC/DC converter.

The apparatus according to the invention comprises a first stage, which contains an input circuit with an inductive element, and for which a DC input voltage is made available. A second stage contains a number of output circuits, which produce the DC output voltages and which feed a number of loads. The first and the second stage of the apparatus according to the invention are connected via a switching means, which is designed to supply a discharge current, which is supplied from the inductive element, to different output circuits in order to feed different loads.

Different DC voltages can be produced in the various output circuits by suitable control of the current flow between the input and output circuits with the aid of the switching means.

The apparatus according to the invention is distinguished by a reduced number of components being used. The multiple use of the input circuit means that only one inductive element is required, thus reducing the component costs and the space required. Switching losses can be reduced by advantageously controlling the current flow.

The loads on the output circuits normally have capacitive characteristics. In one advantageous refinement of the invention, the loads on a number of the output circuits have capacitive elements. These can be charged deliberately with the aid of the discharge current, and stabilize that particular DC output voltage. In one particularly preferred embodiment, the loads on all the output circuits have capacitive elements.

A further advantageous refinement of the invention is characterized in that the switching means is designed for selective electrical connection and disconnection of loads on different output circuits with the inductive element of the first stage. This means that, despite the multiple use of the input circuit, a high degree of process variability can be ensured for the connection and disconnection of the output circuits to and from the input circuit, so that it is possible to satisfy different requirements relating to the loads supplied by the output circuits.

The switching means may comprise one or more multi-way switches and/or one-way switches or isolating switches. In one preferred embodiment, the switching means is formed by a number of isolating switches, each of which is arranged between a connection of the inductive element and a connection of one of the loads on the output circuits. The use of isolating switches ensures that the switching means is switched with sufficient synchronicity, that is to say the current flowing through the inductive element is not interrupted at any time by switching processes in the output circuits or in the input circuit. Otherwise, interruption of the current would result in a destructive voltage spike.

In one particularly preferred embodiment, the switching means contains a number of parallel-connected isolating switches, with each isolating switch connecting one output circuit to the input circuit, and contains an isolating switch in the input circuit. This embodiment of the switching means can be driven in a particularly simple manner.

In one preferred embodiment of the apparatus according to the invention, the switching means is driven by a control means, which measures the voltage in the output circuits and controls the current flow from the input circuit to the output circuits as a function of these measured values, by emitting control signals in order to drive the switching means. DC output voltages from the output circuits may in this case be measured by means of A/D converters. It is also possible to use comparators. Other suitable measurement apparatuses for determination of the voltages in the output circuits can also be used, as well as combinations of different measurement apparatuses.

In a further advantageous refinement of the invention, the duration of the current flow from the input circuit to the output circuits is set. It may also be advantageous to vary the sequence in which the output circuits are fed. Furthermore, different procedures may be combined in order to reliably provide the voltages in the DC output circuits.

According to a further preferred refinement of the invention, a control means is provided, which controls at least one of the DC output voltages. This can be achieved, for example, by controlling the current through the inductive element, thus influencing the extent to which the inductive element is charged. The control process ensures that the desired DC output voltage is always reached, and is not exceeded.

The number of voltages to be controlled can be reduced by suitable control of the current flow from the input circuit to the output circuits. In one particularly preferred embodiment, only one of the DC output voltages is controlled. This allows a physically simple control loop to be formed.

In one particularly preferred embodiment, the charging time duration of the inductive element, that is to say the time interval during which the current flow is built up through the inductive element, is used as a manipulated variable for the control means. For example as soon as it is necessary to increase the charge level on the inductive element as a result of an increase in the power demand on an output circuit, this can be achieved by lengthening the charging time duration of the inductive element. However, it is also feasible to use other suitable manipulated variables, which can be used to control the extent to which the inductive element is charged. Furthermore, the duration of the current flow from the input circuit to the various output circuits may be used as a manipulated variable for controlling the DC output voltages.

In a further preferred embodiment, the apparatus according to the invention is equipped with means to prevent the current flow from the output circuits to the input circuit, which would reduce the efficiency of the DC/DC converter according to the invention.

In one advantageous refinement, the means with a diode function are located in a number of the output circuits. The use of such passive means makes it possible to design the open-loop and closed-loop control means in a simple form, since the current flow from the output circuits back into the inductive element in the input circuit need not be actively suppressed. This problem occurs in particular when the loads on the output circuits have capacitive characteristics. This saves measurement apparatuses, for example for determination of the zero crossing of the current.

In one particularly preferred refinement, a means with a diode function is located in one, and in only one, of the output circuits, thus further reducing the number of components in the overall apparatus.

A first method according to the invention passes through a number of step elements cyclically, with one step element comprising two sub-steps. In the first sub-step of a first step element, a current is produced in the inductive element, and the inductive element is charged. In the second sub-step of the first step element, the current flowing through the inductive element is passed to a first output circuit, with the load on the first output circuit being fed by discharging the inductive element. The voltage for the first output circuit is produced in this way.

In the subsequent step element, the inductive element is first of all charged in an equivalent manner to the first step element in a first sub-step. In the second sub-step, the current is passed to a second output circuit, and the load on the second output circuit is fed. The output voltage for the second output circuit is produced in this way.

A step element based on the above pattern is carried out for each output circuit in which a voltage is intended to be produced. The advantage of the first method according to the invention is that it is possible to produce two or more DC output voltages independently of one another. By way of example, load changes on one output circuit have no effects on the voltage in the other output circuits.

In one advantageous refinement of the method according to the invention, the DC output voltages are controlled. The control process ensures that the amount of charge which is required to feed the respective load is passed to the output circuit in each step element. The amount of charge on the inductive element, which is reached at the end of the first sub-step of the corresponding step element in the next cycle, is adapted as a function of the voltage which is produced in the output circuit under consideration at the end of the second sub-step of a given step element. It is possible to react to load changes on the output circuits within one cycle duration.

In one preferred refinement of the method according to the invention, the current falls to zero at the end of each step element. Each step element thus starts with a completely discharged inductive element, that is to say the amount of charge at the start of the first subsection of a given step element is zero. The amount of charge on the inductive element at the end of the first subsection thus depends solely on the electrical energy deposited during the first subsection. In order to achieve an intended amount of charge, it is thus only necessary to control the deposited energy. In this preferred refinement, the control process uses the charging time duration of the inductive element as a manipulated variable.

A second method according to the invention is based on a charging step for the inductive element and at least two charging steps for different output circuits being carried out successively, by discharging the inductive element.

Since a number of output circuits are charged with the aid of one charging phase of the inductive element, the number of charging steps of the inductive element within one cycle is reduced. Thus, on the one hand, the number of switching processes is reduced, thus reducing the switching losses and increasing the efficiency of the DC/DC converter according to the invention. Secondly, only those output circuits which are charged immediately before a renewed charging process of the inductive element require means with a diode function, since this is the only occasion on which a zero crossing of the current can take place.

The DC output voltages are preferably monitored in the output circuits. The charging steps for the output circuits are ended when a nominal voltage which is associated with that particular output circuit is reached. It is also feasible to control the DC output voltages via the duration of the charging steps for the output circuits.

In one advantageous refinement, the current which is built up in the first charging step of the inductive element is controlled as a function of the total load on the output circuits. The manipulated variable in this case is the duration of the charging step of the inductive element. Advantageously, (only) the output voltage in the most recently charged output circuit is controlled for this purpose. It is thus possible to produce a number of DC output voltages with only a single, or at least only a reduced number, of DC output voltages being controlled. Those DC output voltages which are not subject to closed-loop control are subject to open-loop control.

In one preferred embodiment of the method, the sequence of the output circuit charging steps which follow a charging step of the inductive element is not predetermined in a fixed manner. The sequence is advantageously changed in order to produce the output voltages reliably. In particular, this makes it possible to react flexibly to a load change.

Before the start of an output circuit charging step, a decision is advantageously made as to whether this output circuit need be recharged at all. If the associated DC output voltage is still above a minimum value, then this charging step is omitted. This further reduces the number of switching processes, and further reduces the switching losses.

In one advantageous refinement of the method according to the invention, a cycle has one, and only one, charging step for the inductive element. This is followed by the charging steps for the output circuits. The value to which the current falls at the end of the output circuit charging steps may in this case be chosen without any restrictions. In particular, the value may be other than zero. The DC/DC converter according to the invention can thus be operated in a mode which corresponds to the CCM mode (continuous conduction mode) of known DC/DC converters, and has the known characteristics, such as a higher output power level.

In one advantageous refinement of the method according to the invention, only the voltage in the most recently charged output circuit is controlled, that is to say one, and only one, DC output voltage is controlled. Furthermore, a means with a diode function is provided only in this output circuit.

In a further advantageous refinement of the invention, a cycle is split into halves which last for identical times. The first half forms the charging step for the inductive element. The loads on the output circuits are fed in the second half.

The invention relates not only to the described refinements, but also extends to all possible combinations of the refinements. In particular, cycles of the two methods according to the invention may be combined with one another.

BRIEF DESCRIPTION OF THE DRAWINGS

Various exemplary embodiments are described in the following text with reference to the drawings, in which:

FIG. 1 shows the time response of the coil current of known DC/DC converters in the CCM and DCM modes (continuous and discontinuous conduction modes);

FIG. 2 shows an exemplary embodiment of the DC/DC converter according to the invention; and FIGS. 3a and 3b show the time response of the switching means, based on two exemplary embodiments of the method according to the invention.

DETAILED DESCRIPTION OF THE PREFERRED EMBODIMENTS

The time response of known DC/DC converters (FIG. 1) is characterized by charging and discharge phases of an inductance or coil. The coil current I increases in the charging phase, and falls in the discharge phases. If the coil current I is not zero at any time, then this is referred to as the so-called CCM mode. If the coil current falls to zero ($t=t_2$), then the DC/DC converter is being operated in the so-called DCM mode. The cycle duration is defined by a charging phase and a discharge phase, and is annotated T.

The left-hand part of FIG. 2 shows the first stage of the apparatus according to the invention, with the input circuit comprising a coil 1 as the inductive element, and a voltage source 2 for providing the DC input voltage Vin. The second stage of the apparatus according to the invention is illustrated in the right-hand area, and comprises three output circuits, which produce three DC output voltages V1, V2 and V3. In this case, each of the three output circuits has an associated load in the form of a capacitance 3, 4, 5. The switching means connects the two stages. This comprises a number of switches S0, S1, S2, S3, which are formed from switching transistors. In this case, each output circuit has an associated switch S1, S2 and S3. A further switch S0 is associated with the input circuit, and connects the coil 1 to earth. The voltages V1, V2, V3 in each output circuit are measured and are supplied to a monitoring means K. The monitoring means K contains an open-loop control circuit, which controls the switches S1, S2, S3 in the output circuits. The monitoring means K also has a closed-loop control circuit, which operates the switch S0 in the input circuit as a function of one or more of the output voltages V1, V2, V3, and synchronizes it to the open-loop control circuit. Furthermore, means with a diode function (not illustrated) are provided in one or more of the output circuits in order to prevent current from flowing back from the output circuits into the input circuit.

The time response of the switches S0, S1, S2, S3 during one cycle, based on the exemplary embodiment of the apparatus according to the invention as illustrated in FIG. 2, is illustrated in FIGS. 3a and 3b for two exemplary embodiments of the method according to the invention. One, and only one, switch is closed at any given time in the two exemplary embodiments (state 1), while all the others are open (state 0). If, at a given time, the closed switch is opened, then one of the other switches is closed at the same time. The switches are closed and opened synchronously, in order not to interrupt the coil current that is flowing. In FIGS. 3a and 3b, a state 0 of a given switch represents an open switch, while the state 1 represents a closed switch.

The cycle described in FIG. 3a is subdivided into three step elements. The first step element starts at t=0. Its first sub-step ends at t=$t_1$. During this sub-step, the switch S0 is closed, and the coil is being charged. At t=$t_1$, the second sub-step of the first step element starts. The switch S1 is closed, and the coil 1 is discharged via the capacitance 5 in the first output circuit. In consequence, the voltage V1 in the first output circuit rises. The DC/DC converter is operated in a mode similar to DCM, that is to say the coil current falls to zero during each coil discharge phase. The charging duration of the coil 1 during the first sub-step of the first step element in the next cycle is controlled as a function of the voltage V1 at the time t=$t_2$. This ensures that a coil current is generated during the first sub-step, which transports a sufficient amount of charge to the capacitance 5 in the first output circuit, and thus maintains the output voltage V1.

The second step element starts at t=$t_2$. In an equivalent manner to the first step element, this contains a first sub-step, during which the coil is charged again (the switch S0 is closed), and a second sub-step (from t=$t_3$ to t=$t_4$), in which the coil current flows into the capacitance 4 in the second output circuit (the switch S2 is closed). The control process takes place in an equivalent manner to that in the first step element. Once again, the third step element is analogous to the two first step elements.

The method results in three output voltages V1, V2, V3 which are independent of one another, with a means having a diode function, which prevents any current flow from the output circuit to the input circuit, being located in each output circuit.

The switching behavior of the switches S0, S1, S2, S3 during one cycle according to the second exemplary embodiment of the method according to the invention is illustrated in FIG. 3b. The first step is the charging step for the coil 1, during which the switch S0 is closed. The charging phase for the capacitance 5 in the first output circuit starts at t=$t_1$. The switch S1 is closed, and the output voltage V1 rises. At t=$t_2$, V1 has reached a nominal value. The control circuit thus opens the switch S1, and closes the switch S2. The charging phase for the capacitance 4 in the second output circuit starts. The output voltage V2 rises, and reaches a nominal value at t=$t_3$. At this moment, the control circuit opens the switch S2 and closes the switch S3. The capacitance 3 in the third output circuit is now charged. In the present exemplary embodiment, the charging phase for the last output circuit lasts until the coil 1 has been completely discharged (t=T). When t=T, a check is carried out to determine whether V3 differs from a nominal value, and the duration of the charging step for the coil in the next cycle is controlled such that a correct voltage V3 is produced even in the most recently charged output circuit. In this method, only the most recently charged (third) output circuit has a means with a diode function (not illustrated), since this is the only place where a zero crossing of the coil current takes place. Furthermore, this exemplary embodiment has only one charging phase for the coil in each cycle, and only the DC output voltage in the most recently charged output circuit is controlled.

In the present exemplary embodiment, the load is in the form of switched loads, that is to say loads which vary over time, and a basic load, that is to say a load which draws current continuously. The controlled output circuit has to feed a basic load since, otherwise, the control mechanism does not work. The basic load is thus connected to the most recently charged output circuit, and the switched loads are connected to the previously charged output circuits.

It may also be advantageous for the monitoring means K to determine not only the voltages in the DC output circuits but also further variables, such as the DC input voltage or the coil current (for example by means of the voltage drop across the switch S0). These variables may be included in the process control for the open-loop or closed-loop control means.

I claim:

1. An apparatus for conversion of a DC input voltage to a number of DC output voltages, comprising:
    a first stage, which has an inductive element which can be charged by a current that is produced by the DC input voltage;
    a second stage, which has a number of output circuits which produce the DC output voltages and each have at least one load, respectively;
    a switching means, which is designed to supply a discharge current, which is supplied from the inductive element, to different output circuits in order to feed different loads; and
    a control means which controls one, and only one, of the DC output voltages by varying the charging time duration of the inductive element in response to the controlled DC output voltage.

2. The apparatus according to claim 1, wherein the load in at least one of the output circuits has capacitive characteristics.

3. The apparatus according to claim 1, wherein the switching means is designed for selective electrical connection and disconnection of loads on different output circuits with the inductive element of the first stage.

4. The apparatus according to claim 3, wherein the switching means has a number of parallel-connected isolating switches, each of which is arranged between a connection of the inductive element and a connection of one of the loads.

5. The apparatus according to claim 4, wherein the isolating switches are formed by switching transistors.

6. The apparatus according to claim 1, comprising a control means, which monitors the DC output voltages from the output circuits, and emits control signals for driving the switching means as a function of the monitored DC output voltages.

7. The apparatus according to claim 6, wherein the control mean has one or more comparators for monitoring one or more DC output voltages.

8. The apparatus according to claim 6, wherein the control means has one or more A/D converters for determination of one or more DC output voltages.

9. The apparatus according to claim 1, comprising a control means, which controls one, and only one, of the DC output voltages by influencing the charging current for the inductive element.

10. The apparatus according to claim 9, wherein the control means sets the charging times duration of the inductive element.

11. The apparatus according to claim 1, wherein a circuit element which prevents any current flow from a capacitive element in the output circuit to the inductive element is provided in at least one output circuit.

12. A method for conversion of a DC input voltage to a number of the DC output voltages, which method has a cycle which comprises the following step elements:
    A) charging of an inductive element with a charging current which is produced by the DC input voltage;

B1) partial discharging of the inductive element via a first load, which is associated with a first output circuit which produces a first DC output voltage;

B2) further discharging of the inductive element via at least one second load, which is associate with a second output circuit which produces a second DC output voltage, wherein:

the DC output voltages in the output circuits are monitored; and the DC output voltage only in that output circuit which was the last output circuit to be charged by the inductive element before renewed charging of the inductive element is controlled by varying the duration of the charging of the inductive element in response to the controlled DC output voltage.

13. The method according to claim 12, wherein a discharge current with a value of greater than 0 flows at the start step A.

14. The method according to claim 12, comprising the following steps:

determination of the DC output voltage in that output circuit which was the last output circuit to be charged by the inductive element before renewed charging of the inductive element; and setting of the charging time duration in the step A) solely as a function of the DC output voltage which is determined in this output circuit.

15. The method according to claim 12, wherein the sequence of the step elements B1) and B2) with respect to the output circuits is changed in the successive cycles.

16. The method according to claim 12, comprising the following steps:

monitoring of a DC output voltage from an output circuit;

decision as to whether the load on this circuit should be fed on the basis of steps B1) or B2) by discharging of the inductive element, as a function of the monitored DC output voltage.

* * * * *